(12) United States Patent
Pullukat et al.

(10) Patent No.: US 6,177,375 B1
(45) Date of Patent: Jan. 23, 2001

(54) HIGH ACTIVITY OLEFIN POLYMERIZATION CATALYSTS

(75) Inventors: Thomas J. Pullukat, Lansdale; Ronald S. Shinomoto, Schwenksville, both of PA (US)

(73) Assignee: PQ Corporation, Berwyn, PA (US)

( * ) Notice: Under 35 U.S.C. 154(b), the term of this patent shall be extended for 0 days.

(21) Appl. No.: 09/037,138

(22) Filed: Mar. 9, 1998

(51) Int. Cl.[7] .............. B01J 31/00; B01J 37/00; C08F 4/02; C08F 4/60
(52) U.S. Cl. .......... 502/104; 502/103; 502/116; 502/117; 502/158; 502/124; 502/128
(58) Field of Search .................. 502/103, 104, 502/112, 116, 118, 158

(56) References Cited

U.S. PATENT DOCUMENTS

| | | |
|---|---|---|
| 3,787,384 | 1/1974 | Stevens et al. . |
| 4,359,403 * | 11/1982 | Hoff et al. ............... 252/429 B |
| 4,374,753 | 2/1983 | Pullukat et al. . |
| 4,388,220 | 6/1983 | Hartshorn et al. . |
| 4,455,386 | 6/1984 | Lynch et al. .............. 502/104 |
| 4,530,912 | 7/1985 | Pullukat et al. . |
| 4,565,796 * | 1/1986 | Etherton .................. 502/117 |
| 4,565,797 * | 1/1986 | Etherton et al. ........... 502/116 |
| 4,618,596 * | 10/1986 | Agapiou et al. ........... 502/116 |
| 4,634,747 * | 1/1987 | Best ...................... 526/124 |
| 4,701,432 | 10/1987 | Welborn, Jr. . |
| 4,894,468 * | 1/1990 | Wilchek et al. ............ 556/416 |
| 5,057,475 | 10/1991 | Canich et al. . |
| 5,155,079 | 10/1992 | Cribbs et al. . |
| 5,232,883 | 8/1993 | Derleth et al. . |
| 5,258,345 * | 11/1993 | Kissin et al. .............. 502/116 |
| 5,670,439 * | 9/1997 | Winslow et al. ........... 502/116 |
| 5,807,938 * | 9/1998 | Kaneko et al. ............ 502/103 |
| 5,824,620 * | 10/1998 | Vega et al. ............... 502/117 |
| 5,834,393 * | 11/1998 | Jacobsen et al. ........... 502/118 |
| 5,846,895 * | 12/1998 | Gila et al. ................ 502/104 |
| 5,939,347 * | 8/1999 | Ward et al. ............... 502/152 |
| 5,972,823 * | 10/1999 | Walzer, Jr. ............... 502/152 |
| 6,087,293 * | 7/2000 | Carnahan et al. .......... 502/158 |

FOREIGN PATENT DOCUMENTS

| | | |
|---|---|---|
| 28 46 185 | 5/1980 | (DE) . |
| 38 40 772 * | 6/1990 | (DE) . |
| 0 293 815 * | 12/1988 | (EP) . |
| 0 497 102 | 8/1992 | (EP) . |
| 0 594 914 * | 5/1994 | (EP) . |
| WO 91/17190 | 11/1991 | (WO) . |
| WO 93/11172 * | 6/1993 | (WO) . |

* cited by examiner

*Primary Examiner*—Mark L. Bell
*Assistant Examiner*—J. Pasterczyk
(74) *Attorney, Agent, or Firm*—Ratner & Prestia

(57) ABSTRACT

A method for preparing a silica supported, α-olefin polymerization catalyst includes the steps of treating a silica support with an organosilane compound, contacting the silylated silica support with a transition metal compound to form an intermediate, then contacting the resulting intermediate with an alkylmagnesium alkoxide to form the catalyst. The transition metal compound is either a metal chloride or a metal chloroalkoxide, and the transition metal is selected from titanium, vanadium, and zirconium. The alkylmagnesium alkoxide may be selected from butylethylmagnesium butoxide, butylethylmagnesium 2-ethylhexoxide, butyloctylmagnesium ethoxide, or butylmagnesium propoxide. The process steps may be carried out in the presence of an aliphatic organic solvent, such as heptane, with a slurry of solids in the solvent being formed during the process steps. Catalysts produced by this process, during which the alkylmagnesium alkoxide contacts the reacting components after the transition metal compound is applied, have higher activities when compared with catalysts prepared by known processes under similar conditions.

15 Claims, No Drawings

HIGH ACTIVITY OLEFIN POLYMERIZATION CATALYSTS

FIELD OF THE INVENTION

This invention relates to olefin polymerization catalysts, particularly α-olefin polymerization catalysts, and methods for preparing such catalysts.

BACKGROUND OF THE INVENTION

Silica-supported catalysts for use in the polymerization of ethylene, propylene, and the copolymerization of ethylene with 1-butene, 1-hexene, 1-octene, and other alkenes are well-known. One type of these silica-supported catalysts is Ziegler-Natta catalysts, which are comprised of reaction mixtures of transition metal compounds and organometallic compounds, primarily organometallic compounds of magnesium and aluminum. Ziegler-Natta catalysts are commonly supported on $MgCl_2$ but silica-supported Ziegler-Natta catalysts are also known. U.S. Pat. No. 3,787,384 discloses catalyst synthesis by reaction of silica with an organomagnesium compound and subsequent treatment of the product with titanium tetrachloride. U.S. Pat. No. 4,374,753 discloses a method in which the silica support is reacted with certain organic silicon compounds to give higher activity, higher melt index capability, and narrower molecular weight distribution. U.S. Pat. No. 4,388,220 discloses a method in which the organomagnesium compound is reacted with alcohols, amines, or carboxylic acids prior to reaction with the silica support, followed by subsequent treatment with the titanium component.

A primary goal of catalyst development is to improve the catalyst activity, typically measured as the rate of polymer production per unit weight of catalyst.

The polyolefins that are made with silica-supported catalysts are suitable for many applications, including injection molding and injection blow molding of thick walled bottles and other containers, coatings for wires and cables, containers such as bags, among many other known uses.

SUMMARY OF THE INVENTION

The present invention is directed to methods for making silica-supported catalysts for the polymerization of α-olefins and the catalysts produced by such methods. A method of the present invention includes the steps of treating a silica support with an organosilane compound to form a silylated silica support, then contacting the silylated silica support with a transition metal compound selected from a metal chloride or a metal chloroalkoxide to form an intermediate. The transition metal can be either titanium, vanadium, or zirconium, but preferably is titanium. Thereafter, the intermediate is contacted with an alkylmagnesium alkoxide to form the catalyst.

According to a preferred embodiment of the present invention, the process steps are carried out in the presence of an aliphatic organic solvent. According to this embodiment, the silica support is treated with an organosilane compound to form a silylated silica support, and the silylated silica support is slurried in a solvent to form a first slurry. The first slurry is then contacted with a first solution of the solvent and a transition metal compound selected from a transition metal chloride or chloroalkoxide to form an intermediate. This intermediate is then contacted with a second solution of the solvent and an alkylmagnesium alkoxide to form a second slurry containing the catalyst. The catalyst in a powder form is isolated by drying the second slurry.

It is to be understood that both the foregoing general description and the following detailed description are exemplary, but are not restrictive, of the invention. Catalysts of the present invention are designed to be used with aluminum co-catalysts also.

DETAILED DESCRIPTION OF THE INVENTION

The present invention is directed to silica supported catalysts suitable for the polymerization of α-olefins. Catalysts of the present invention can be used to produce a wide range of polyolefins including, but not limited to, polyethylene, polyethylene copolymers with propylene, and other α-olefins which form as solids under the conditions of known gas phase and slurry polymerization processes.

In general, three steps are involved in preparing the silica supported catalyst of the present invention and are carried out in the following order:
1. Treating a silica support with an organosilane compound to form a silylated silica support;
2. Contacting the silylated silica support with a transition metal chloride or chloroalkoxide; and
3. Contacting the intermediate from step 2 with an alkylmagnesium alkoxide to form the catalyst.

Before step 1 above, a silica support must be provided. Silica supports, and their methods of preparation, are well-known in the art. The silica supports used in connection with the present invention may be those available from commercial sources or can be made by art-accepted processes using methods of preparation and purification known in the prior art. For example, the silica supports used in connection with the present invention can be prepared by the methods described in U.S. Pat. No. 5,232,883.

The porous silica supports suitable for this invention may have surface areas from about 200 to about 800 $m^2/g$ and pore volumes from about 1.0 to about 4.0 ml/g. The particles may be spherical in shape or angular with diameters of about 20 to about 200 microns. Silica supports have surface reactive groups which typically consist of or include hydroxyl groups. The total surface hydroxyl content may vary from 1.0 to 4.0 mmol/g after drying at 200° C. for five hours, depending on the surface area of the support. After silane treatment, surface hydroxyl content may vary from 0.30 to 1.3 mmol/g, depending on the surface area of the support.

The shape of the particles which make up the silica component may be spherical and/or granular, although they are preferably spherical for better flowability. The range of surface areas, pore volumes, and pore diameters specified above preferably includes substantially all of the particles of the porous silica component. If there are spherical-shaped and granular-shaped particles in a mixture, both types individually should preferably have the specified characteristics. The silica component of the present invention may contain up to a total of 5% weight/weight (w/w) of a compound including titanium, aluminum, boron, magnesium or other elements. The silica component of the catalyst of the present invention preferably contains from about 60 to about 98% and preferably at least 80% w/w silica, the remaining amount being the catalytic compound. Preferably, at least 70% of the initial pore volume of the silica support remains in the catalysts after synthesis.

Prior to treating the silica support with an organosilane compound, the silica may be dried to completely remove surface water at a temperature less than about 800° C. Alternatively, the drying may be partial in some cases in order to leave a small amount of water or the drying can be eliminated entirely depending on the structure of the organosilane compound. Usually, it is preferable to at least partially remove the surface water from the silica support. For example, in the case of hexamethyldisilazane, a controlled amount of water on silica catalyzes the reaction of hexamethyldisilazane with silica.

The silica support is first treated with an organosilane compound to form a silylated silica support. As used herein, the term "organosilane compound" shall have the same meaning as described in U.S. Pat. No. 4,374,753, incorporated herein by reference. In particular, the organosilane compounds useful in this invention have the following chemical formulae:

or

wherein m is 1, 2, or 3, n is 3, 2, or 1, respectively, the total of m+n=4, and X is a group chemically reactive with the hydroxyl groups of the silica support such as chloride, amide, alkoxide, phenoxide, and the like. The invention requires at least one such reactive group. If more than one are used, they may be the same or different. Examples of reactive groups are —F, —Cl, —Br, —OCH$_3$, —OCH$_2$CH$_3$, —NH$_2$, —N(CH$_3$)$_2$, —N(H-)Si(CH$_3$)$_3$, —CH$_2$CH$_2$CH$_2$Cl, —CH$_2$CH$_2$CH$_2$NH$_2$, —OCH$_2$CH$_2$OCH$_3$, —O$_2$CCH$_3$, and —CH$_2$CH$_2$CH$_2$SH. The R group is a hydrocarbon group containing only carbon and hydrogen. It may be, for example, alkyl, phenyl, or alkenyl such as vinyl.

The amount of organosilane compound may be in excess of the surface reactive groups on the silica. When this is the case, the conversion of the surface reactive groups can be made as complete as possible. The unreacted excess of silicon compound can be removed by distillation at less than 200° C. at decreased pressure if necessary or by heat and inert gas purging. The reaction product of the silica with the organosilane compound should not be heated above 300° C. Heating above 300° C. might lead to thermal decomposition of the bonded silane groups. The amount of organosilane compound may also be less than the stoichiometric equivalent of the surface reactive groups of the silica. In this case, all of the organosilane compound may become attached to the surface so that no removal of excess is necessary.

Treating the silica support with an organosilane compound can be carried out in any known manner. This step might involve spraying an organosilane compound over the silica support in a nitrogen atmosphere. The reactants are mixed, then purged with nitrogen to remove excess ammonia, and finally left to stand to permit the reaction to proceed typically for a period of at least several days. Thus, after this treatment, the silica support is said to be a silylated silica support meaning that at least half (and preferably substantially all) of the reactive hydroxyl groups of the silica support have been converted to —O—Si R$_n$X$_{m-1}$.

The silylated silica support is then contacted with a transition metal compound selected from the group consisting of a metal chloride and a metal chloroalkoxide (i.e., a metal chloride, a metal chloroalkoxide, or a combination of both). The transition metal may be titanium, vanadium, or zirconium, or a combination thereof. In general, the reactivity of the transition metal decreases with increasing molecular weight, so titanium is the most preferable transition metal. In the event that a transition metal chloride is chosen, the most preferable compound is titanium tetrachloride. In the event that a transition metal chloroalkoxide is chosen, the number of carbon atoms in the alkoxide group can range from 1 to 12, preferably from 2 to 4.

The amount of transition metal compound added is dependent upon the number of surface reactive groups on the silica support. Generally, the amount of transition metal compound can vary from 1 to 200% of the surface reactive groups, although it is preferably just less than the amount of surface reactive groups, such as 80–95%. Generally, amounts ranging from about 0.5 to about 2.5 mmol of transition metal compound per gram of silica appear to be suitable, preferably about 1.25 mmol/g.

The silylated catalysts according to the present invention are contacted with a transition metal compound in a conventional manner as is known in the art. Preferably, the silylated silica is first slurried in a suitable solvent and the transition metal compound is dissolved in the same solvent to form a solution, then the slurry and the solution are combined to effect contact of the silylated silica support with the transition metal compound. Typically, the transition metal/solvent mixture is added to the slurry of silylated silica while stirring, and stirring is continued for a period of time sufficient to permit an even reaction. The reaction can typically be carried out at room temperature, although the reaction conditions depend on the particular components chosen. Suitable solvents include many aliphatic organic solvents, such as heptane, hexane, octane, and decane. Alternatively, a solution of the transition metal compound may be added just to fill the pore volume of silica.

The third general step of the invention, contacting the intermediate with an alkylmagnesium alkoxide to form the catalyst, is also carried out in a known manner. The alkyl group of the alkylmagnesium compound may have from 1 to 18 carbon atoms, and preferably from 2 to 8. The carbon atoms of the alkoxide group may range from 2 to 8, preferably from 3 to 6. Exemplary alkylmagnesium alkoxides suitable for use in the present invention include butylethylmagnesium butoxide, butylethylmagnesium 2-ethylhexoxide, butyloctylmagnesium ethoxide, or butylmagnesium propoxide, or combinations thereof. The alkylmagnesium alkoxide of the present invention is formed in a known manner by reacting an alkylmagnesium compound with a reactive agent, which typically include alcohol compounds.

The amount of alkylmagnesium alkoxide added depends on the amount of the transition metal added. The maximum loading of the alkylmagnesium alkoxide depends on the surface area of the support. Normally, the transition metal compound and the alkylmagnesium alkoxide are added in an amount to achieve a molar ratio of magnesium:transition metal in the range of from about 0.5:1 to 2:1, preferably about 1:1. Typically, it is not desirable to exceed this ratio because of the expense of magnesium compounds, although it is possible to do so. Generally, amounts ranging from about 0.5 to about 2.5 mmol of alkylmagnesium alkoxide per gram of silica appear to be suitable, preferably about 0.8 mmol/g–1.25 mmol/g.

When the process steps are carried out in the presence of a solvent, the alkylmagnesium alkoxide is dissolved in the solvent to form a solution which is added to the mixture of the silylated silica and the transition metal compound. Again, process conditions (including reaction times and temperatures) can be adjusted as needed depending on the reactivity of the particular components selected. In this embodiment, the resulting slurry must be dried of the solvent (typically under a nitrogen purge) to yield the catalyst as a free-flowing powder. Drying may also be accomplished by heating and/or drawing a vacuum.

The catalysts of the present invention may be used in gas or slurry phase processes, both processes being known by those skilled in the art of polymerizing olefins. The polymerization may be conducted at a temperature in the range of from about 0 to 160° C. or higher and under atmospheric, subatmospheric or superatmospheric conditions. In a slurry polymerization, a suspension of solid, particulate polymer is formed in a liquid polymerization medium containing a monomer or monomers, to which hydrogen and a catalyst are added. Solvents used in the polymerization medium include propane, 2-butane, cyclopentane and the like. Gas-phase polymerization processes utilize superatmospheric pressures and temperature ranges of from about 80° C. to about 105° C. The polymerization is performed in a stirred or fluidized bed of catalyst and product particles in a pressure vessel. Monomers, hydrogen, and optionally an inert diluent gas, such as nitrogen, are introduced into the vessel while maintaining the required temperature range. The formed polymer can be withdrawn continuously. The polymer obtained can be extruded and cut into the desired shapes.

EXAMPLES

The following examples will further illustrate the essential features of the present invention.

EXAMPLE 1

(Present Invention)

Catalyst Synthesis

All procedures were performed under a dry nitrogen atmosphere.

In a 0.5 cubic foot blender, about 1000 grams of a high pore volume (3.0 cc/g) microspherical silica gel having a surface area of 400 m$^2$/g microspherical silica gel was loaded in. While rotating the blender under an atmosphere of nitrogen, about 130 grams of hexamethyldisilazane (HMDS) was added onto the support over a 30 minute period and then allowed to mix for an additional 30 minutes. After purging with nitrogen to remove excessive ammonia, the HMDS-treated silica is discharged into a two gallon bucket. A lid was placed loosely on the bucket and the reaction allowed to proceed for three weeks inside a ventilated area. The silylated silica gel was dried at 150° C. under nitrogen for 10 hours in a fluidized bed. In a 250 ml 3-neck round bottom flask equipped with paddle stirrer, 3.0 grams of the above dried silylated silica gel was slurried in about 30 ml heptane. Next, 1.2 ml of TiCl$_4$ in heptane (2.52 mmol/ml) was added dropwise with stirring to the silica/heptane slurry. It was stirred for one hour. Then, 4.0 ml of butylethylmagnesium butoxide in heptane (0.75 mmol/ml) was added dropwise with stirring to the reaction mixture in the flask. It was stirred for one hour. The flask was placed in an oil bath heated to 100° C. and the slurry mixture dried under a nitrogen purge for four hours. Catalyst yield was 3.5 grams of dark brown free-flowing powder.

EXAMPLE 2

(Comparative Example)

In a 250 ml 3-neck round bottom flask equipped with paddle stirrer, 3.0 g of the dried silylated silica gel described in the Inventive Example 1 was slurried in about 25 ml heptane. Next, 4.0 ml of butylethylmagnesium butoxide in heptane (0.75 mmol/ml) was added dropwise with stirring to the silica/heptane slurry. It was stirred for one hour. Then, 1.2 ml of TiCl$_4$ in heptane (0.75 mmol/ml) was added dropwise with stirring to the reaction mixture in the flask. It was stirred for one hour. The flask was placed in an oil bath heated to 100° C. and the slurry mixture dried under a nitrogen purge for four hours. Catalyst yield was 3.4 grams of red brown free-flowing powder.

EXAMPLE 3

Catalyst Activity in Polymerization Process

The catalysts synthesized in Inventive Example 1 and Comparative Example 2 were used in the following polymerization process in order to determine their activities. The process used was the same for each polymerization.

A solution of 500 ml of isobutane and a 20:1 Al/Ti ratio of a 25% w/w TIBAL/heptane was charged into a one liter reactor under nitrogen and heated to 100° C. The solution was saturated with ethylene to 400 psig total pressure. Then 20 to 50 mg of catalyst was charged into the reactor with 50 ml isobutane/500 psig ethylene from a 300 cc bomb. Ethylene was fed continuously on demand to the polymerization reaction mixture at 400 psig total pressure. After reacting for thirty minutes, the reaction was stopped and the isobutane and gases vented. Activity was determined. The results are shown below.

| Sample | Example 1 (Inventive) | Example 2 (Comparative) |
|---|---|---|
| Activity, g/g cat/hr | 11000 | 7080 |

The higher activity of Inventive Example 1 is unexpected. Previous inventors claim the order of addition to TiCl$_4$ after RMgOR' is essential to obtain improved performance of the catalyst.

EXAMPLE 4

(Inventive Example)

Catalyst Synthesis

The procedure of Inventive Example 1 was repeated except that 4.8 ml of 0.62 mmol/ml butylethylmagnesium 2-ethylhexoxide in heptane was substituted for butylethylmagnesium butoxide. A yield of 3.6 grams of dark brown powder was obtained.

EXAMPLE 5

(Comparative Example)

The procedure of Comparative Example 2 was repeated except that 4.8 ml of 0.62 mmol/ml butylethylmagnesium 2-ethylhexoxide in heptane was substituted for butylethylmagnesium butoxide. A yield of 3.8 grams of red brown powder was obtained.

EXAMPLE 6

(Inventive Example)

The procedure of Inventive Example 1 was repeated except that 3.1 ml of 0.96 mmol/ml butyloctylmagnesium ethoxide in heptane was substituted for butylethylmagnesium butoxide. A yield of 3.8 grams of chocolate brown powder was obtained.

EXAMPLE 7

(Comparative Example)

The procedure of Comparative Example 2 was repeated except that 3.1 ml of 0.96 mmol/ml butyloctylmagnesium ethoxide in heptane was substituted for butylethylmagnesium butoxide. A yield of 3.2 grams of red brown powder was obtained.

EXAMPLE 8
Catalyst in Polymerization Process

The catalysts synthesized in Inventive Examples 4 and 6 and Comparative Examples 5 and 7 were used in the following polymerization process in order to determine their activities. The process used was the same for each polymerization.

In a 500 ml Fischer-Porter bottle, a solution of 0.5 ml of 25% w/w TIBAL/heptane in 200 ml of dry heptane was saturated with ethylene at 5 psig. Then 10 to 20 mg of catalyst was added in a dry box to the saturated solution, the solution heated to 70° C. and ethylene was fed continuously on demand to the polymerization reaction mixture at 5 psig total pressure. After reacting for one hour, the reaction was stopped and the gases vented. The contents of the bottle were poured into a metal tray and the solvent allowed to evaporate in a fume hood. Activity was determined. The results are shown below.

| Sample | Activity, g/g cat/hr |
| --- | --- |
| Example 4 (Inventive) | 202 |
| Example 5 (Comparative) | 53 |
| Example 6 (Inventive) | 158 |
| Example 7 (Comparative) | 37 |

The higher activities of Inventive Examples 4 and 6, and the degree to which they are higher, are unexpected. Previous methods emphasize the importance of adding TiCl$_4$ after RMgOR' to obtain improved performance of the catalyst.

Although illustrated and described with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for preparing a silica supported, α-olefin polymerization catalyst comprising the steps of:
   treating a silica support having reactive surface hydroxyl groups with an organosilane compound to form a silylated silica support having some remaining reactive surface hydroxyl groups;
   contacting said silylated silica support with a transition metal compound selected from the group consisting of at least one of a metal chloride and a metal chloroalkoxide, wherein said metal is selected from the group consisting of at least one of titanium, vanadium, and zirconium, to form an intermediate; and
   contacting said intermediate with an alkylmagnesium alkoxide to form said catalyst.

2. The method of claim 1 further comprising slurrying said silylated silica support in a solvent before contacting said silylated silica support with said transition metal compound, wherein:
   the step of contacting said silylated silica support with said transition metal compound includes dissolving said transition metal compound in said solvent to form a first solution and contacting said silylated silica support with said first solution; and
   the step of contacting said intermediate with said alkylmagnesium alkoxide includes dissolving said alkylmagnesium alkoxide in said solvent to form a second solution and contacting said intermediate with said second solution.

3. The method of claim 2 further comprising drying said second solution to yield said catalyst in a power form.

4. The method of claim 2, wherein said solvent is an aliphatic organic solvent.

5. The method of claim 1, wherein said silica support comprises particles having:
   a) an average surface area of about 200 to about 800 m$^2$/g of silica; and
   b) an average pore volume of about 1.0 to about 4.0 ml/g of silica.

6. The method of claim 1, wherein said transition metal compound is said metal chloride.

7. The method of claim 6, wherein said metal chloride is titanium tetrachloride.

8. The method of claim 1, wherein said alkylmagnesium alkoxide is selected from the group consisting of at least one of butylethylmagnesium butoxide, buthylethylmagnesium 2-ethylhexoxide, butyloctylmagnesium ethoxide, and butylmagnesium propoxide.

9. The method of claim 1, wherein:
   said transition metal compound is added in an amount of from about 0.5 mmol/g silica to about 2.5 mmol/g silica;
   said alkylmagnesium alkoxide is added in an amount of from about 0.5 mmol/g silica to about 2.5 mmol/g silica; and
   said transition metal compound and said alkylmagnesium alkoxide are added in an amount to achieve a molar ratio of magnesium:transition metal in the range of from about 0.5:1 to 2:1.

10. A method for preparing a silica supported, α-olefin polymerization catalyst comprising the steps of:
    treating a silica support having reactive surface hydroxyl groups with an organosilane compound to form a silylated silica support having some remaining reactive surface hydroxyl groups;
    slurrying said silylated silica support in a solvent to form a first slurry;
    contacting said first slurry with a first solution of said solvent and a transition metal compound selected from the group consisting of at least one of a metal chloride and a metal chloroalkoxide, wherein said metal is selected from the group consisting of at least one of titanium, vanadium, and zirconium, to form an intermediate;
    contacting said intermediate with a second solution of said solvent and an alkylmagnesium alkoxide to form a second slurry containing said catalyst; and
    drying said second slurry to yield said catalyst in a powder form.

11. The method of claim 10, wherein:
    said transition metal compound is titanium chloride;
    said alkylmagnesium alkoxide is selected from the group consisting of butylethylmagnesium butoxide, butylethylmagnesium 2-ethylhexoxide, butyloctylmagnesium ethoxide, and butylmagnesium propoxide; and
    said solvent is an aliphatic organic solvent.

12. The method of claim 10, wherein said organosilane compound has a chemical formula of:

$$(R_3Si)_2NH,$$

wherein R is a hydrocarbon group containing only carbon and hydrogen.

13. The method of claim 10, wherein said organosilane compound has a chemical formula of:

$$R_3SiX_1,$$

wherein:

R is a hydrocarbon group containing only carbon and hydrogen;

X is a group chemically reactive with the reactive surface hydroxyl groups of the silica support and is selected from the group consisting of: —F, —Cl, —Br, —OCH$_3$, —OCH$_2$CH$_3$, —NH$_2$, —N(CH$_3$)$_2$, —N(H)Si(CH$_3$)$_3$, —CH$_2$CH$_2$CH$_2$Cl, —CH$_2$CH$_2$CH$_2$NH$_2$, —OCH$_2$CH$_2$OCH$_3$, —O$_2$CCH$_3$, and —CH$_2$CH$_2$CH$_2$SH.

14. The method of claim 1, wherein said organosilane compound has a chemical formula of:

$$(R_3Si)_2NH,$$

wherein R is a hydrocarbon group containing only carbon and hydrogen.

15. The method of claim 1, wherein said organosilane compound has a chemical formula of:

$$R_3SiX_1,$$

wherein:

R is a hydrocarbon group containing only carbon and hydrogen;

X is a group chemically reactive with the reactive surface hydroxyl groups of the silica support and is selected from the group consisting of: —F, —Cl, —Br, —OCH$_3$, —OCH$_2$CH$_3$, —NH$_2$, —N(CH$_3$)$_2$, —N(H)Si(CH$_3$)$_3$, —CH$_2$CH$_2$CH$_2$Cl, —CH$_2$CH$_2$CH$_2$NH$_2$, —OCH$_2$CH$_2$OCH$_3$, —O$_2$CCH$_3$, and —CH$_2$CH$_2$CH$_2$SH.

* * * * *